E. P. BERNARD.
Improvement in Carving Dishes.
No. 126,253.                             Patented April 30, 1872.
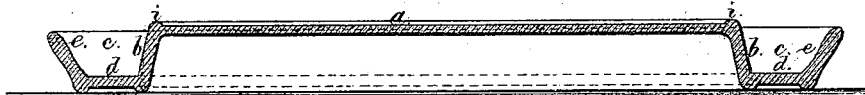
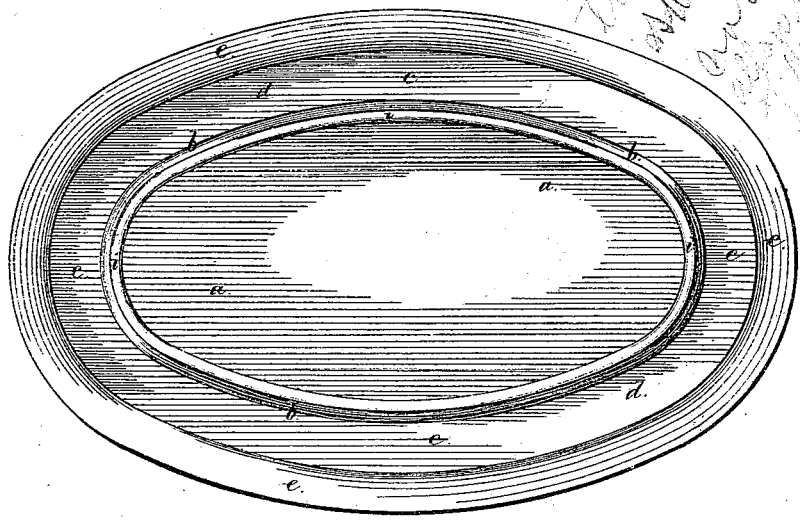

UNITED STATES PATENT OFFICE.

ERNEST P. BERNARD, OF NEW YORK, N. Y.

IMPROVEMENT IN CARVING-DISHES.

Specification forming part of Letters Patent No. 126,253, dated April 30, 1872.

*To all whom it may concern:*

Be it known that I, ERNEST P. BERNARD, of the city and State of New York, have invented an Improvement in Carving-Dishes; and the following is declared to be a correct description of the same.

Dishes have heretofore usually been made with the central portion the lowest, and with a rim around the disk that inclines slightly inward; hence a joint of meat, a steak, a chicken, or other article requiring to be carved rests down in the hollow portion of the dish in a manner that renders it difficult to carve, because the knife-edge is liable to come into contact with the edge of the dish, and the elbow has often to be elevated to an inelegant and inconvenient position for the carver.

My invention is made for removing these difficulties, and facilitating carving by elevating the joint or article to be carved to a sufficient height to keep the knife clear of the edge of the dish and allow the carver increased opportunity for carving gracefully. My invention is a new article of manufacture, consisting of a carving-dish with an elevated center, and a channel around the same between the raised platform and rim, whereby the article to be carved is sustained at a higher elevation than the rim, and there will be a receptacle for gravy, dressing, &c., around the dish. The carver can cut with greater facility, and the edge of his knife is not liable to be blunted by coming into contact with the rim.

In the drawing, Figure 1 is a plan of an oval dish, and Fig. 2 is a section of the same.

The dish may be square, round, or polygonal, and of any desired size. The platform $a$ is elevated by the inner flange $b$, which forms one side of the channel $c$, the bottom $d$ and rim $e$ of such channel being made of China, earthenware, or other material, in one piece. The platform $a$ and the upper edge of the rim $e$ are about at the same level; hence there will be nothing to obstruct the free use of the knife in carving. The gravy will run into the channel in the rim, and there can be an enlargement at one part of the dish to facilitate the dipping up of the gravy with a spoon. The bottom of the channel may be inclined. The rib or bead $i$ around the dish at the edge of the platform will prevent the article slipping while being carved. This rib should have notches in it, or openings from the platform down to the channel, to allow gravy to run into the latter. The channel $c$ may entirely, or only partially, surround the elevated platform.

I claim as my invention—

The carving-dish, made with an elevated central platform surrounded by the channel $c$ and rim, as and for the purposes set forth.

Signed by me this 25th day of March, 1872.

E. P. BERNARD.

Witnesses:
GEO. T. PINCKNEY,
CHAS. H. SMITH.